UNITED STATES PATENT OFFICE.

ARTHUR HEINEMANN, OF SOUTH KENSINGTON, LONDON, ENGLAND.

SYNTHETIC CAOUTCHOUC.

1,035,788.

No Drawing.

Specification of Letters Patent. Patented Aug. 13, 1912.

Application filed January 23, 1912. Serial No. 672,950.

*To all whom it may concern:*

Be it known that I, ARTHUR HEINEMANN, a subject of the King of Prussia, residing at 10 Sumner Terrace, Onslow Square, South Kensington, London, S. W., England, have invented new and useful Improvements Relating to Synthetic Caoutchouc, of which the following is a specification.

Two of the most valuable properties of natural caoutchouc are its elasticity and resiliency. These qualities are due to the structure arising from the presence of proteids, or, as they are sometimes termed, proteins.

The object of the present invention is to impart to synthetically produced caoutchouc the above referred to properties of natural caoutchouc and consists in the addition of proteids or proteins, such as those enumerated below, to liquid hydrocarbon from which synthetic caoutchouc may be produced.

The following is an example of a way in which the invention may be carried out:—According to this example 2 parts of the proteid or protein are mixed or are emulsified with 100 parts of the hydrocarbon, for instance isoprene, from which synthetic caoutchouc can be produced. The isoprene so treated is then converted into caoutchouc in any known manner.

Instead of employing the additive substance or substances in the proportions above referred to the amounts thereof may be varied according to the quality of caoutchouc to be produced, that is to say the properties which it will possess as compared with the natural substance.

It is to be understood that the proteid or protein may, so long as it imparts to the convertible hydrocarbon, the desired properties, be of vegetable or animal origin. The added substances may consist, for instance, of keratin, pure proteins or peptones.

Having now described my invention what I have invented and desire to secure by Letters Patent of the United States is as follows:—

A method of imparting to synthetic caoutchouc obtained from isoprene the elastic and resilient properties peculiar to natural caoutchouc consisting in adding a protein obtained from vegetable or animal sources to said isoprene and then converting the mixture into caoutchouc, substantially as described herein.

In testimony whereof I have signed my name to this specification in the presence of two subscribing witnesses.

ARTHUR HEINEMANN.

Witnesses:
ROBERT FRIDLEY,
BARTLEY F. YOST.